United States Patent
Maeda

(10) Patent No.: US 9,369,597 B2
(45) Date of Patent: Jun. 14, 2016

(54) IMAGE PROCESSING APPARATUS AND METHOD FOR CONTROLLING THEREOF

(71) Applicant: Oki Data Corporation, Tokyo (JP)

(72) Inventor: Masayuki Maeda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/694,286

(22) Filed: Apr. 23, 2015

(65) Prior Publication Data

US 2015/0319319 A1 Nov. 5, 2015

(30) Foreign Application Priority Data

Apr. 30, 2014 (JP) ................................. 2014-094048

(51) Int. Cl.
*H04N 1/00* (2006.01)
*G06T 11/60* (2006.01)

(52) U.S. Cl.
CPC ............ *H04N 1/00411* (2013.01); *G06T 11/60* (2013.01); *H04N 2201/0094* (2013.01)

(58) Field of Classification Search
USPC .................... 358/1.13, 2.1; 345/173; 715/744
See application file for complete search history.

(56) References Cited

U.S. PATENT DOCUMENTS

| | | | | |
|---|---|---|---|---|
| 6,072,476 A | * | 6/2000 | Harada | G06F 1/1601 345/1.1 |
| 6,559,967 B1 | * | 5/2003 | Akiba | H04N 1/00411 358/1.13 |
| 7,729,012 B2 | * | 6/2010 | Nishimura | H04N 1/0035 358/2.1 |
| 8,610,745 B2 | * | 12/2013 | Shoji | G06F 3/04886 345/156 |
| 8,610,933 B2 | * | 12/2013 | Tani | G03G 15/502 345/173 |
| 8,719,711 B2 | * | 5/2014 | Katsumata | G03G 15/5016 715/744 |

FOREIGN PATENT DOCUMENTS

JP 2005-195816 A 7/2005

* cited by examiner

*Primary Examiner* — Allen H Nguyen
(74) *Attorney, Agent, or Firm* — Muncy, Geissler, Olds & Lowe, P.C.

(57) ABSTRACT

An image processing apparatus includes a function selection receipt screen display part, a function selection object management unit; an editing receipt part that receives an editing instruction for editing a function selection receipt screen that is for editing the functions related to the information processes, or for editing an arrangement position of the function selection objects on the function selection receipt screen. The function selection object management unit edits the screen configuration information based on the editing instruction received by the editing receipt part, and the function selection receipt screen display part displays the function selection receipt screen based on the screen configuration information managed by the function selection object management unit.

18 Claims, 22 Drawing Sheets

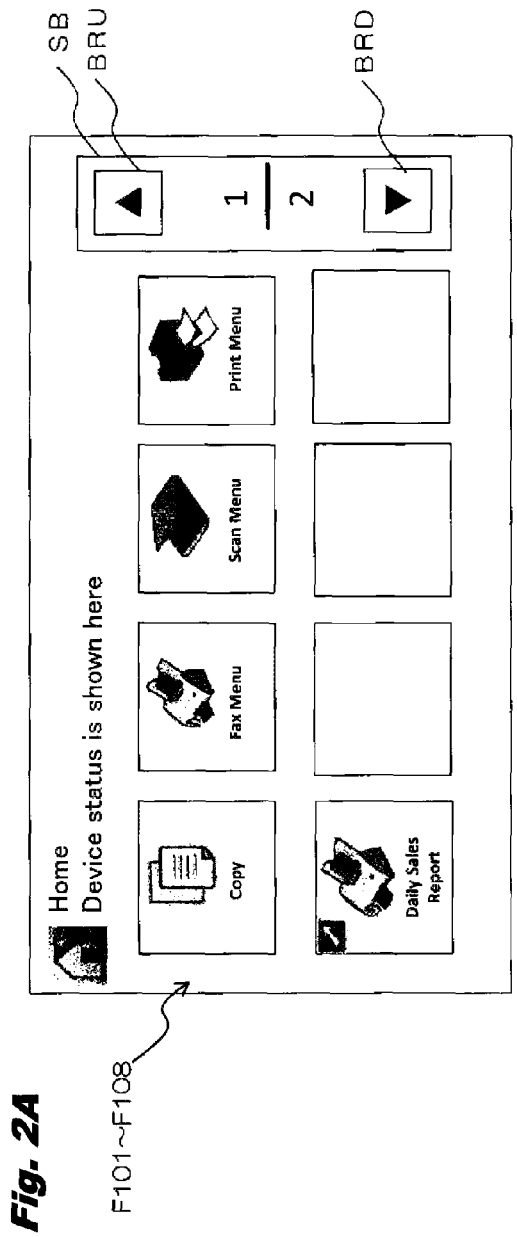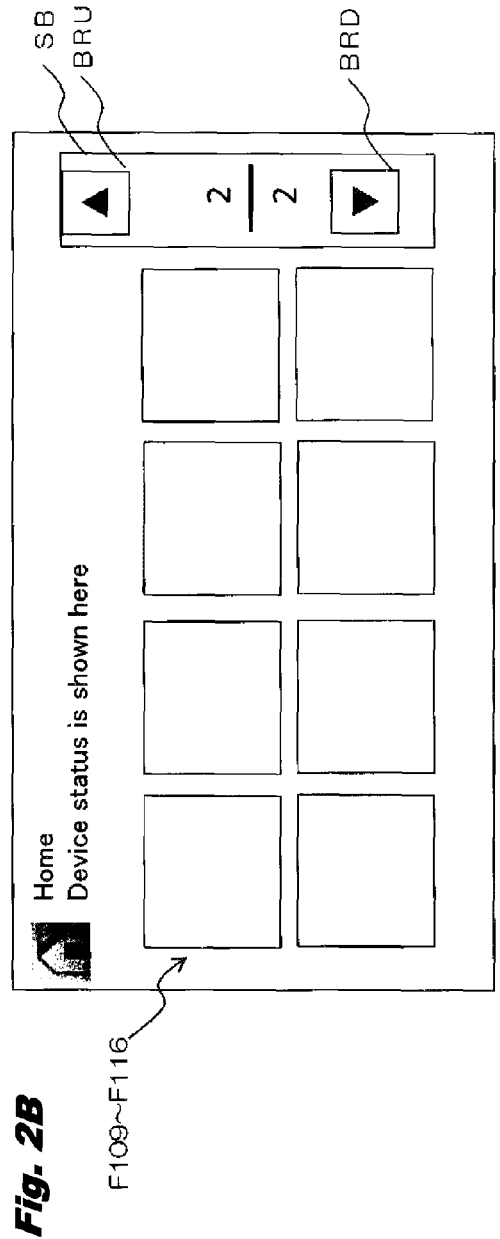

Fig. 3

| Management No. | Function Name |
|---|---|
| 01 | Copy |
| 02 | Fax Menu |
| 03 | Scan Menu |
| 04 | Print Menu |
| 05 | Daily Sales Report |
| 06 | Unregistered |
| 07 | Unregistered |
| 08 | Unregistered |
| 09 | Unregistered |
| 10 | Unregistered |
| 11 | Unregistered |
| 12 | Unregistered |
| 13 | Unregistered |
| 14 | Unregistered |
| 15 | Unregistered |
| 16 | Unregistered |

Fig. 7

| Management No. | Function Name |
|---|---|
| 01 | Copy |
| 02 | Fax Menu |
| 03 | Internet Fax |
| 04 | Scan Menu |
| 05 | Print Menu |
| 06 | Daily Sales Report |
| 07 | Unregistered |
| 08 | Unregistered |
| 09 | Unregistered |
| 10 | Unregistered |
| 11 | Unregistered |
| 12 | Unregistered |
| 13 | Unregistered |
| 14 | Unregistered |
| 15 | Unregistered |
| 16 | Unregistered |

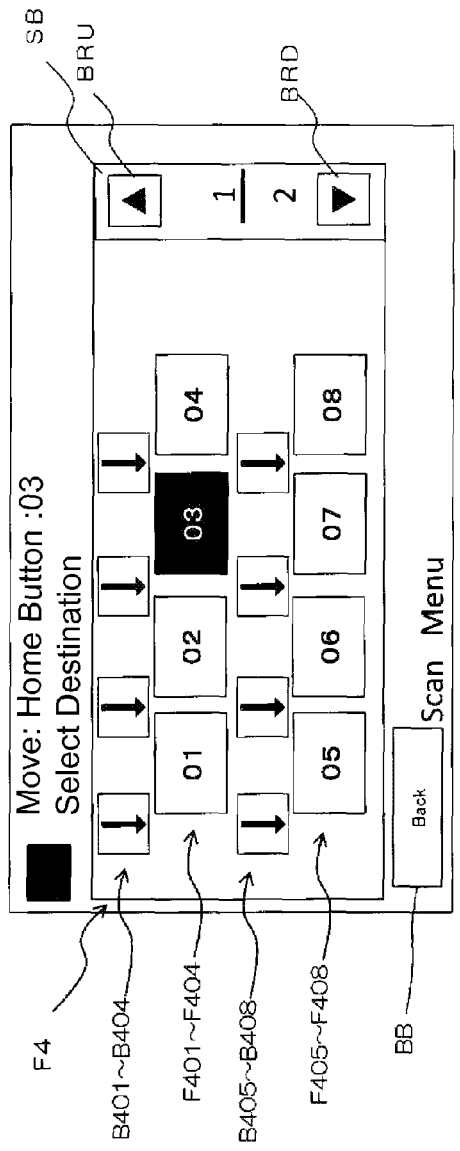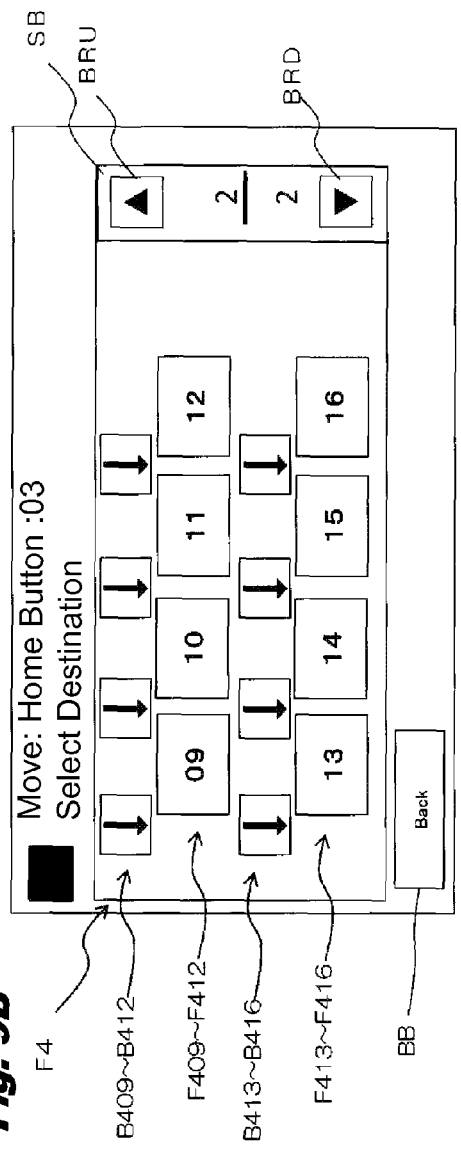

Fig. 10

| Management No. | Function Name |
|---|---|
| 01 | Scan Menu |
| 02 | Copy |
| 03 | Fax Menu |
| 04 | Print Menu |
| 05 | Daily Sales Report |
| 06 | Unregistered |
| 07 | Unregistered |
| 08 | Unregistered |
| 09 | Unregistered |
| 10 | Unregistered |
| 11 | Unregistered |
| 12 | Unregistered |
| 13 | Unregistered |
| 14 | Unregistered |
| 15 | Unregistered |
| 16 | Unregistered |

*Fig. 12*

| Management No. | Function Name |
|---|---|
| 01 | Copy |
| 02 | Fax Menu |
| 03 | Unregistered |
| 04 | Scan Menu |
| 05 | Print Menu |
| 06 | Daily Sales Report |
| 07 | Unregistered |
| 08 | Unregistered |
| 09 | Unregistered |
| 10 | Unregistered |
| 11 | Unregistered |
| 12 | Unregistered |
| 13 | Unregistered |
| 14 | Unregistered |
| 15 | Unregistered |
| 16 | Unregistered |

*Fig. 14*

| Management No. | Function Name |
|---|---|
| 01 | Copy |
| 02 | Fax Menu |
| 03 | Internet Fax |
| 04 | Print Menu |
| 05 | Daily Sales Report |
| 06 | Unregistered |
| 07 | Unregistered |
| 08 | Unregistered |
| 09 | Unregistered |
| 10 | Unregistered |
| 11 | Unregistered |
| 12 | Unregistered |
| 13 | Unregistered |
| 14 | Unregistered |
| 15 | Unregistered |
| 16 | Unregistered |

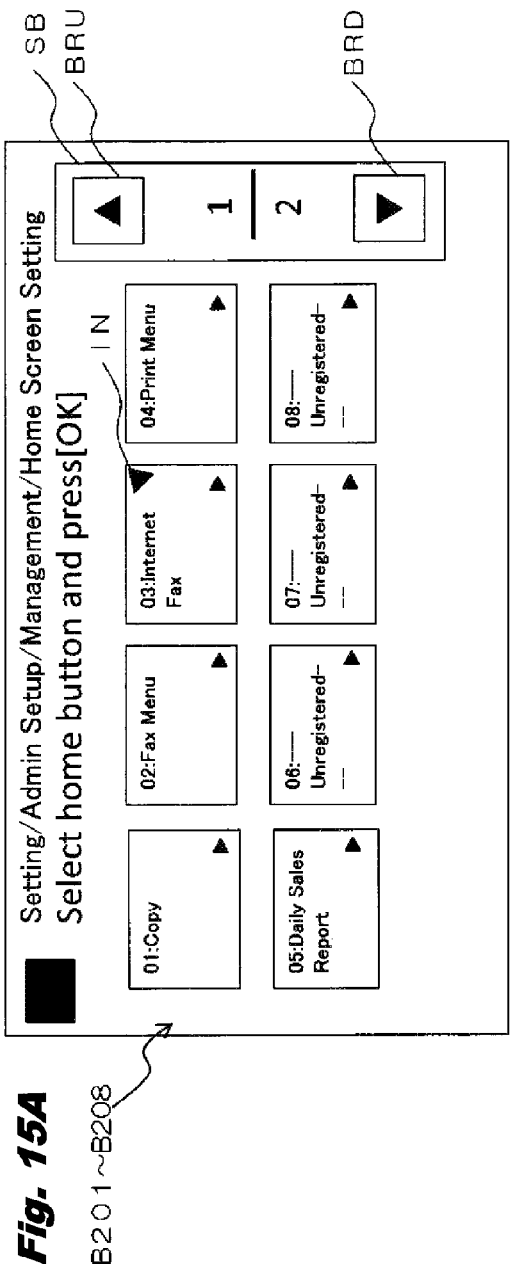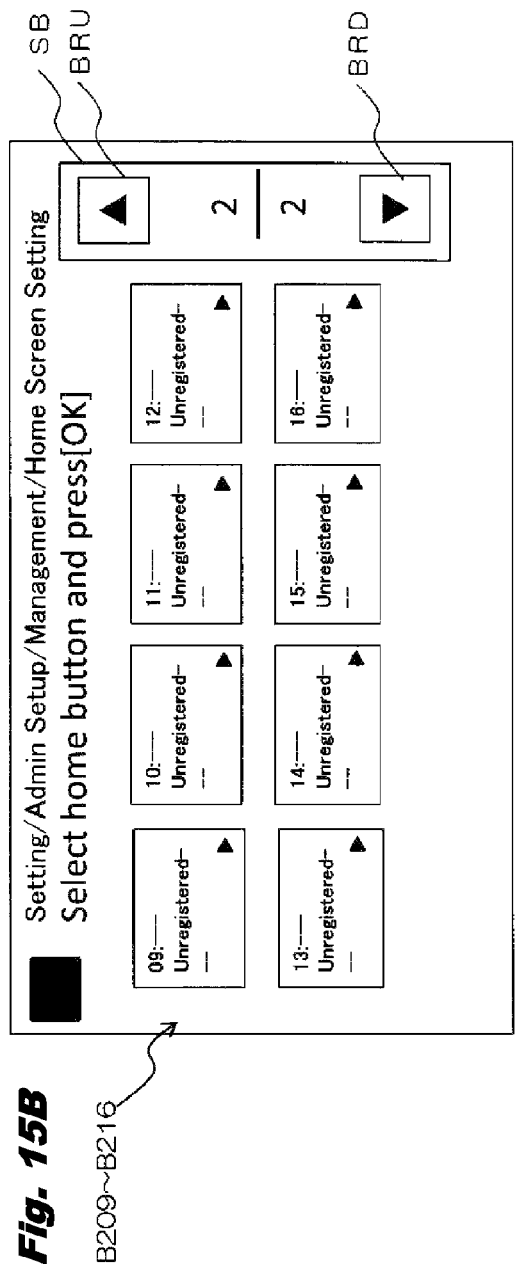

Fig. 16

| Management No. | Function Name |
|---|---|
| 01 | Copy |
| 02 | Fax Menu |
| 03 | Print Menu |
| 04 | Daily Sales Report |
| 05 | Unregistered |
| 06 | Unregistered |
| 07 | Unregistered |
| 08 | Unregistered |
| 09 | Unregistered |
| 10 | Unregistered |
| 11 | Unregistered |
| 12 | Unregistered |
| 13 | Unregistered |
| 14 | Unregistered |
| 15 | Unregistered |
| 16 | Unregistered |

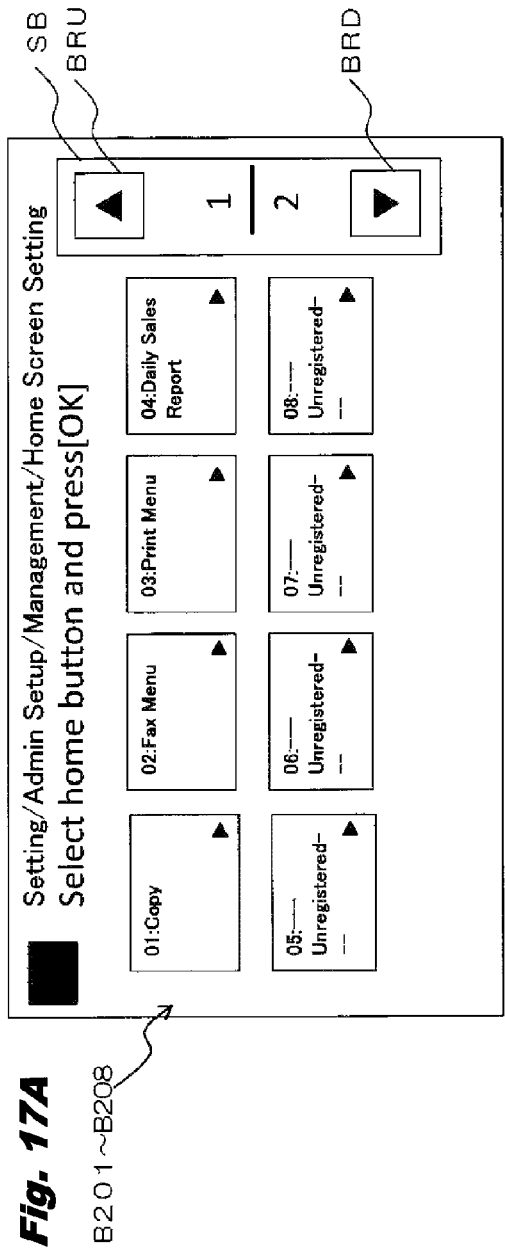
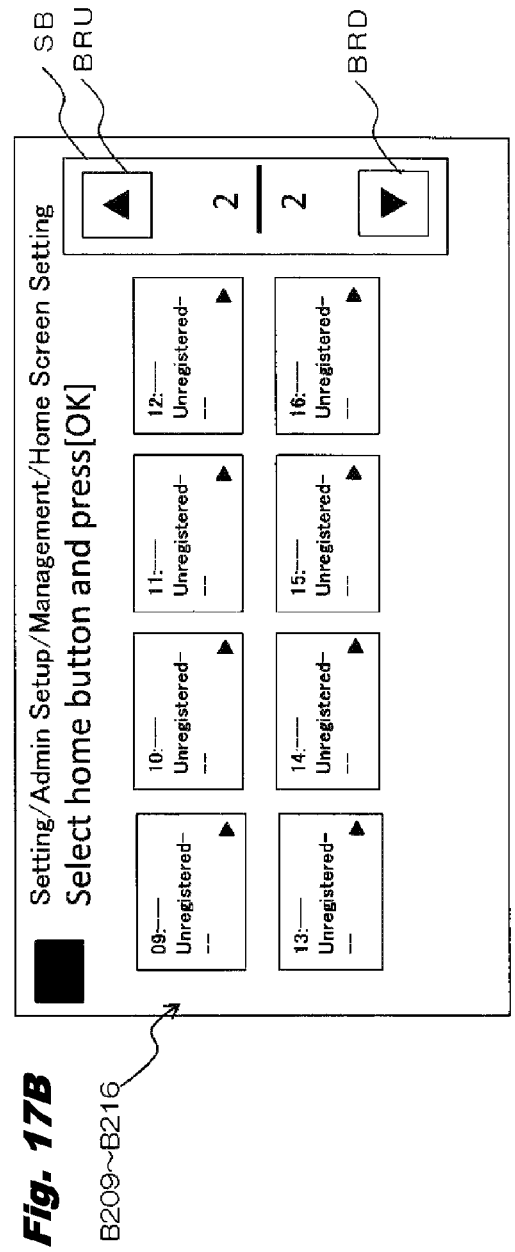
Fig. 17A
Fig. 17B

Fig. 20

| Function Name | Number of Usage Times |
|---|---|
| Copy | 0 |
| Scan To Email | 4 |
| Scan To FAX | 6 |
| Scan To USBMemory | 3 |
| ⋮ | ⋮ |

Scan To Email Has Already Been Arranged On Function Selection Home Screen

Because Number Of Usage Times Is Larger, Scan To Fax Has Been Added On Function Selection Home Screen

IMAGE PROCESSING APPARATUS AND METHOD FOR CONTROLLING THEREOF

CROSS REFERENCE

The present application is related to, claims priority from and incorporates by reference Japanese Patent Application No. 2014-094048, filed on Apr. 30, 2014.

TECHNICAL FIELD

The present invention relates to an image processing apparatus and a method for controlling the image processing apparatus, which is applicable to a multifunction peripheral (MFP) that is able to display an operation screen.

BACKGROUND

A display device used in a conventional MFP, etc. includes a customizing function that enables a user to select a frequently-used function with a small number of operation times. The device is described in Patent Document 1 below.

In the device disclosed in the patent literature, it is possible to customize to arrange a frequently-used function selection button on a setting screen that is often used by a user. Therefore, a frequently-used function can be selected with a small number of operation times.

[Patent Document 1] Japanese Unexamined Patent Application Publication No. 2005-195816

In the conventional device, it is possible to customize a function selection button arranged on a basic screen. However, it is impossible to change a layout thereof to a user's preferred arrangement. In other words, even if it is possible to operate with a small number of operation times, it is still not always possible to provide an interface satisfied by a user.

An image processing apparatus and a method for controlling the image processing device that improve user operation are desired.

An image processing apparatus disclosed in the application includes a function selection receipt screen display part that displays a function selection receipt screen that displays a plurality of function selection objects arranged thereon, the function selection objects being for selecting functions related to information processes; a function selection object management unit that manages screen configuration information that respectively relates the plurality of function selection objects displayed on the function selection receipt screen by the function selection receipt screen display part to information of functions of the information processes corresponding to the function selection objects; an editing receipt part that receives an editing instruction for editing the function selection receipt screen that is for editing the functions related to the information processes corresponding to the function selection objects on the function selection receipt screen, or for editing an arrangement position of the function selection objects on the function selection receipt screen. The function selection object management unit edits the screen configuration information based on the editing instruction received by the editing receipt part, and the function selection receipt screen display part displays the function selection receipt screen based on the screen configuration information managed by the function selection object management unit.

A method disclosed in the application for controlling an image processing apparatus that comprises a function selection receipt screen display unit, a function selection object management unit, and an editing receipt unit includes causing the function selection receipt screen display unit to display a function selection receipt screen on which a plurality of function selection objects for receiving function selection related to image processing are arranged, causing the editing receipt unit to receive an input of an editing instruction from the function selection receipt screen as using a position selection screen for selection a position of the function selection receipt screen to be edited and an editing operation contents receipt screen for receiving editing operation contents of the position selected on the position selection screen when the function selection object management unit manages screen configuration information that a function identifier related to the function selection object and an arrangement position identifier of the function selection object are corresponded for the function selection object displayed on the function selection receipt screen by the function selection receipt screen display unit, and causing the function selection object management unit to update the screen configuration information based on the editing instruction received by the editing receipt unit.

According to the present invention, it is possible to provide an image processing apparatus and a method for controlling the image processing device that improve user operation

BRIEF DESCRIPTION OF DRAWINGS

FIGS. 2A and 2A are explanatory views that show a configuration example of a function selection home screen displayed on the image forming apparatus according to the first embodiment.

FIG. 3 is an explanatory view that shows a configuration example of a home button registration information memorized by the image forming apparatus according to the first embodiment.

FIG. 7 is an explanatory view that shows an example (No. 1) of change of the home button registration information displayed on the image forming apparatus according to the first embodiment.

FIGS. 9A and 9B are explanatory views that show a configuration example of a destination selection screen displayed on the image forming apparatus according to the first embodiment.

FIG. 10 is an explanatory view that shows an example (No. 2) of change of the home button registration information displayed on the image forming apparatus according to the first embodiment.

FIG. 12 is an explanatory view that shows an example (No. 3) of change of the home button registration information displayed on the image forming apparatus according to the first embodiment.

FIG. 14 is an explanatory view that shows an example (No. 4) of change of the home button registration information displayed on the image forming apparatus according to the first embodiment.

FIGS. 15A and 15B are explanatory views that show an example (No. 4) of change of the home button selection screen displayed on the image forming apparatus according to the first embodiment.

FIG. 16 is an explanatory view that shows an example (No. 5) of change of the home button registration information displayed on the image forming apparatus according to the first embodiment.

FIGS. 17A and 17B are explanatory views that show an example (No. 5) of change of the home button selection screen displayed on the image forming apparatus according to the first embodiment.

FIG. 20 is an explanatory view that shows a configuration example of function execution measurement information memorized in the image forming apparatus according to the second embodiment.

Figure 1:
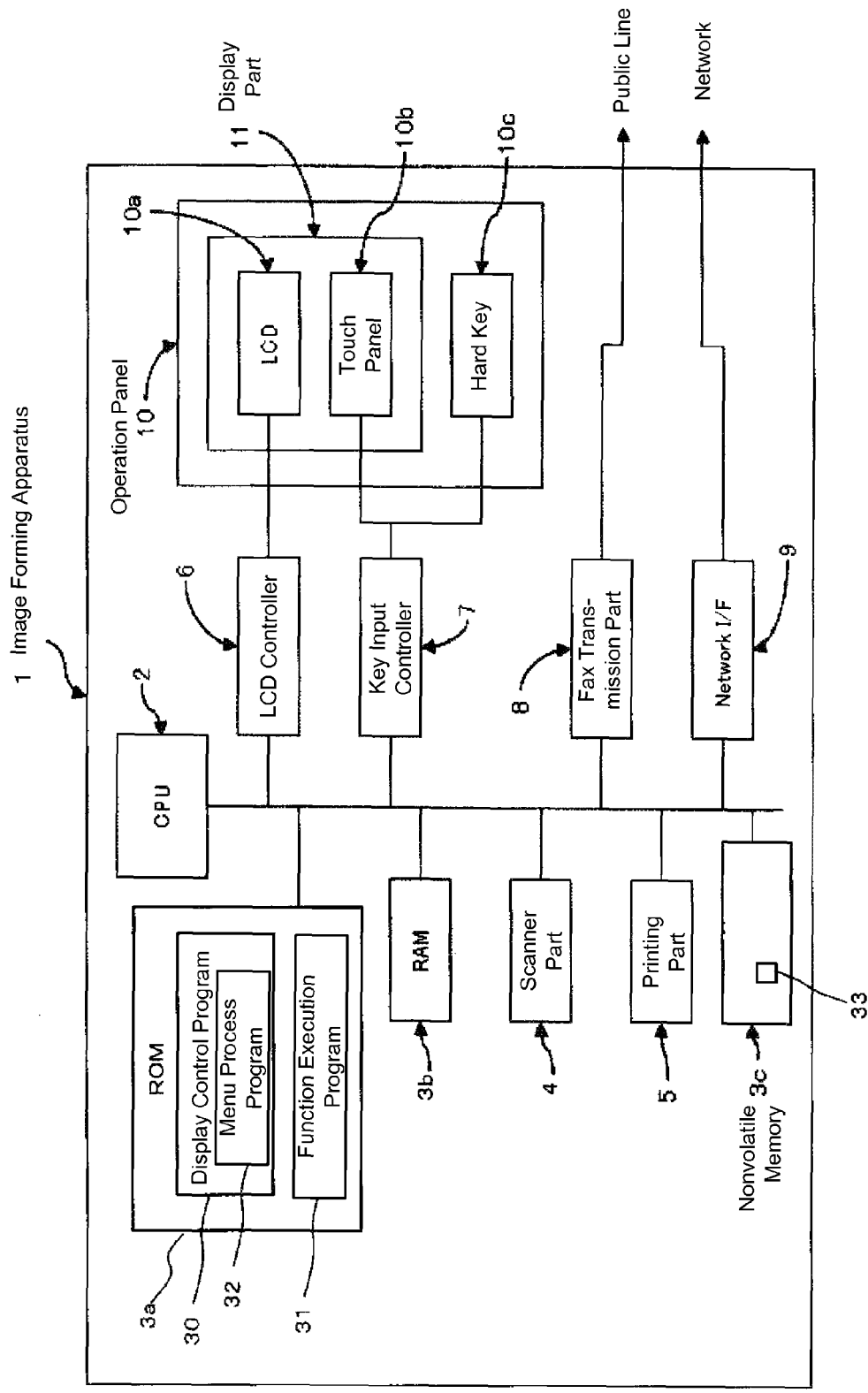
FIG. 1 is a block diagram that shows a functional configuration of an image forming apparatus according to a first embodiment.

DETAILED DESCRIPTION OF EMBODIMENTS (A) First Embodiment

Hereinafter, a first embodiment of an image processing apparatus and a method for controlling the image processing device in the present invention is explained in detail as referring to the drawings. Hereinafter, an example that the image processing apparatus in the present invention is applied to an image forming apparatus performing as a multifunctional peripheral (MFP) is explained.

(A-1) Configuration of the First Embodiment

FIG. 1 is a block diagram that shows an entire configuration of an image forming apparatus 1 of the first embodiment.

The image forming apparatus 1 is an apparatus performing as a MFP, and includes a CPU 2, a ROM 3a, a RAM 3b, a nonvolatile memory 3c, a scanner part 4, printing part 5, a key input controller 7, a fax transmission part 8, a network interface (I/F) 9, and an operation panel 10.

The CPU 2 performs a control of the entire apparatus and various types of information processing (data processing). The CPU 2 reads a program (program including a display control program 30 and function execution program 31) memorized in the ROM 3a at the time of start-up of the image forming apparatus 1, develops it, and executes it.

Also, in the RAM 3b, various data such as setting screen data, etc, which is data necessary for the CPU 2 to execute a program, is also memorized. Also, the CPU 2 accesses data memorized in the nonvolatile memory 3c along with the program execution. In the nonvolatile memory 3c, information that should be stored even while the power supply is off is memorized.

The scanner part 4 generates an image of a read manuscript set by a user in response to the control of the CPU 2.

The printing part 5 performs image printing (image formation) on a printing sheet (medium) (not shown) in response to the control of the CPU 2.

The fax transmission part 8 is connected to a public line (telephone line), and performs transmission of fax signals in response to the control of the CPU 2.

The network I/F 9 is an interface (for example, Ethernet/IP® interface) for connection to an IP network such as LAN. The CPU 2 is connected to the network by the network I/F 9 and receives printing job data, etc. from the external (for example, client/host such as PC).

The operation panel 10 is a device that performs a function of a user interface for performing the information output to a user and the receipt of user operation. In the embodiment, in the operation panel 10, a display part 11 and a hard key 10c are arranged as devices related to the user interface. The display part 11 is configured with a liquid crystal display (LCD) 10a and a touch panel 10b arranged on a screen of the LCD 10a. The display part 11 and a hard key 10c are arranged on the operation panel 10.

The LCD controller 6 displays an image on the LCD 10a based on an image (image signals) supplied from the CPU 2.

The key input controller 7 performs a function of sending signals input from the touch panel 10b and the hard key 10c (hereinafter, to be referred to as "key input signal") to the CPU 2. In the touch panel 10b, upon being pressed by a finger of a user, etc., coordinate data (X-Y coordinate data) of a pressed position is output from the key input controller 7 to the CPU 2 as a key input signal.

Next, descriptions of programs executed by the CPU 2 are given.

A function execution program 31 executes data processing (for example, print processing, image reading, image processing, image data transmission, etc.) necessary for executing a function of the MFP as using the scanner part 4, the printing part 5, the fax transmission part 8, and the network I/F 9, etc.

A display control program 30 performs a control of display contents of the LCD 10a (including an update of the display contents based on the contents input from the touch panel 10b) and includes a menu process program 32.

The menu process program 32 performs a process related to a menu screen of the operation screen shown to a user on the LCD 10a.

The menu process program 32 performs a display control of a screen on which various frequently-used function buttons are arranged (hereinafter, to be referred to as "function selection home screen" or "function selection receipt screen"). The function selection home screen is an initial screen or a screen that is accessible by a user with a relatively small number of times (an upper layer of the screen) in a menu screen in a layered structure displayed by the menu process program 32. In other words, the home button functions as a shortcut (function selection object) for executing various functions (including execution of a process for shifting to execution screens of the various functions and execution of job macro process for executing a series of plural processes, etc.) executed by the image forming apparatus 1.

FIGS. 2A and 2B show a configuration example of the function selection home screen provided by the menu process program 32 to a user in the present embodiment.

The function selection home screen has a configuration that allows a plurality of the home buttons corresponding to the various functions provided by the image forming apparatus 1 to be arranged.

In the example of the present embodiment, as illustrated in FIGS. 2A and 2B, the function selection home screen shows a field (field having 4 columns×2 rows) that is able to show 8 home buttons at the most in one screen (one page). Also, a scroll bar SB is provided in the function selection home screen, and operation with a roll up button BRU and a roll down button BRD enables the displayed home buttons (position of displayed screen) to be scrolled (switched). In the examples of FIGS. 2A and 2B, FIG. 2A shows display contents of first page of the function selection home screen, and FIG. 2B shows display contents of second page (screen that can be reached by pressing the roll down button BRD from the first page). Also, when the roll up button BRU is pressed when the second page shown in FIG. 2B is shown on the function selection home screen, the screen is changed to show the first page (screen illustrated in FIG. 2A).

As illustrated in FIG. 2A, on the first page of the function selection home screen, 8 fields F101-F108 that show home buttons are arranged. Also, as illustrated in FIG. 2B, 8 fields F109-F116 that show home buttons are arranged on the second page of the function selection home screen.

In other words, in the image forming apparatus 1 of the present embodiment, by scrolling the function selection home screen having two pages, a configuration that can display 16 home buttons at the most is obtained. Note, the number of pages of the function selection home screen and the number of home buttons per page are not limited to this.

In the function selection home screen, it is possible to customize by allocating an arbitrary function (type) of home button to an arbitrary field. In the image forming apparatus 1, it is possible for a user of the image forming apparatus to execute functions provided by the image forming apparatus without using the function selection home screen. However, for executing the functions in a more simple way, the function selection home screen is prepared. Note, as a method for receiving an order of function execution without using the function selection home screen, there is a configuration for executing functions by operating menu items several times for example. However, it is possible to provide a configuration the same as one for other MFP as the method, so a detail explanation is omitted.

The menu process program 32 also executes management of contents of the home buttons displayed in the field (fields F101-F116) on the function selection home screen. Specifically, the contents of the home buttons displayed on the fields (fields F101-F116) are managed by updating home button registration information 33 as screen configuration information memorized in the nonvolatile memory 3c in the present embodiment.

FIG. 3 is an explanatory view that shows a configuration example of the home button registration information 33.

In the home button registration information 33 illustrated in FIG. 3, function names corresponding to management numbers 01-16 ("unregistered" in case of unregistered). The function names work as function identifiers for identifying the functions.

The management numbers work as arrangement position identifiers that show arrangement positions (array orders and array positions) of the home buttons on the function selection home screen.

Note, the management numbers of the fields F101-F116 of the function selection home screen are respectively assigned 01-16. For example, the management number corresponding to the field F101 is 01, and the management number corresponding to the field F102 is 02.

In the home button registration information 33 illustrated in FIG. 3, as the function names corresponding to the management numbers 01-05, Copy (copier function) Fax Menu (facsimile function), Scan Menu (scanning function), Print Menu (printing function), and Daily Sales Report (function to execute printing of a predetermined image data) are registered. In the home button registration information 33 illustrated in FIG. 3, the function names corresponding to the management numbers 06-16 are unregistered.

The menu process program 32 displays icons of buttons corresponding to the function names in the fields of the function selection home screen based on the contents of the home button registration information 33. For example, when the contents of the home button registration information 33 are the contents in FIG. 3, the configuration of the fields F101-F116 of the function selection home screen is as illustrated in FIGS. 2A and 2B. For example, in 33 illustrated in FIG. 3, the function name corresponding to the management number 01 is Copy, the menu process program 32 displays an icon of button corresponding to Copy (copier function) in the field F101 of the function selection home screen.

Also, when a button of the fields of the function selection home screen is pressed, the menu process program 32 executes a process corresponding to the function name registered in the home button registration information 33. For example, in 33 in FIG. 3, the button displayed in the field F101 is Copy (copier function). When the button of the field F101 is pressed, the menu process program 32 orders the function execution program 31 to execute a copy process (it is also possible to display a copier function on an executable operation screen).

(A-2) Performance of First Embodiment

Next, a performance of the image forming apparatus 1 of the first embodiment having the above-described configuration is explained.

Hereinafter, a process about a customizing operation (editing operation) of the function selection home screen in the image forming apparatus 1 is explained.

The image forming apparatus 1 (menu process program 32) displays a screen (hereinafter, to be referred to as "home button selection screen" or "position selection screen") that receives information about a position to be edited by a user on the function selection home screen (editing of an arrangement configuration of the home buttons) upon the receipt of a predetermined operation (for example, not-shown menu operation, pressing of the predetermined hard key 10c, etc.).

Figure 4:
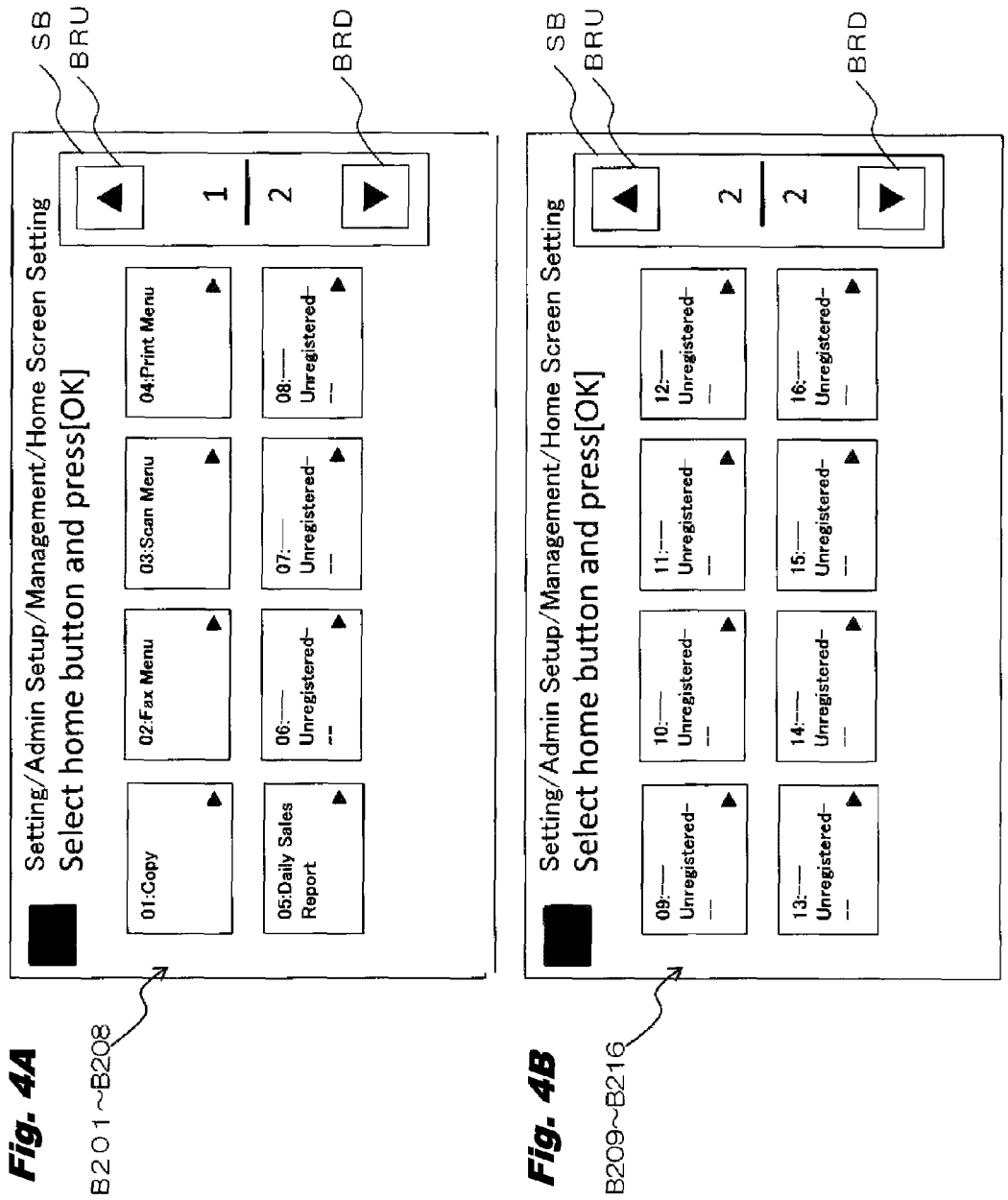
FIGS. 4A and 4B are explanatory views that show a configuration example of a home button selection screen displayed on the image forming apparatus according to the first embodiment.

FIGS. 4A and 4B are explanatory views that show a configuration example of the home button selection screen.

On the home button selection screen, a current arrangement of the home button is displayed, and it is possible to select a position that is a target of editing (target of customizing).

Specifically, as illustrated in FIGS. 4A and 4B, on the home button selection screen, buttons (hereinafter, to be referred to as "position selection buttons") for selecting positions to be targets of editing are arranged in the visually same layout as the one of the function selection home screen. In the position selection buttons, management numbers corresponding to the position selection buttons and function names corresponding to the management numbers are displayed. In FIGS. 4A and 4B, in the position selection buttons corresponding to the management numbers whose function names are unregistered, "Unregistered" that indicates unregistered is displayed.

In the home button selection screen in FIGS. 4A and 4B, as the same as the function selection home screen, 8 position selection buttons at the most (position selection buttons having 4 columns×2 rows) are provided in one screen (one page). Also, a scroll bar SB is provided in the home button selection screen, and operation with a roll up button BRU and a roll down button BRD enables the screen (switch of displayed position) to be scrolled. In the examples of FIGS. 4A and 4B, FIG. 4A shows display contents of first page of the home button selection screen, and FIG. 4B shows display contents of second page. Note, the number of pages of the home button selection screen and the number of home buttons per page are not limited, however, it is preferred to have a layout visually same as the one of the function selection home screen.

When any one of the position selection button is pressed in the home button selection screen, the menu process program 32 displays a screen (hereinafter, to be called to as "operation selection screen" or "editing operation contents receipt screen") for receiving operations related to the position selection button (management number corresponding to the position selection button).

Figure 5:
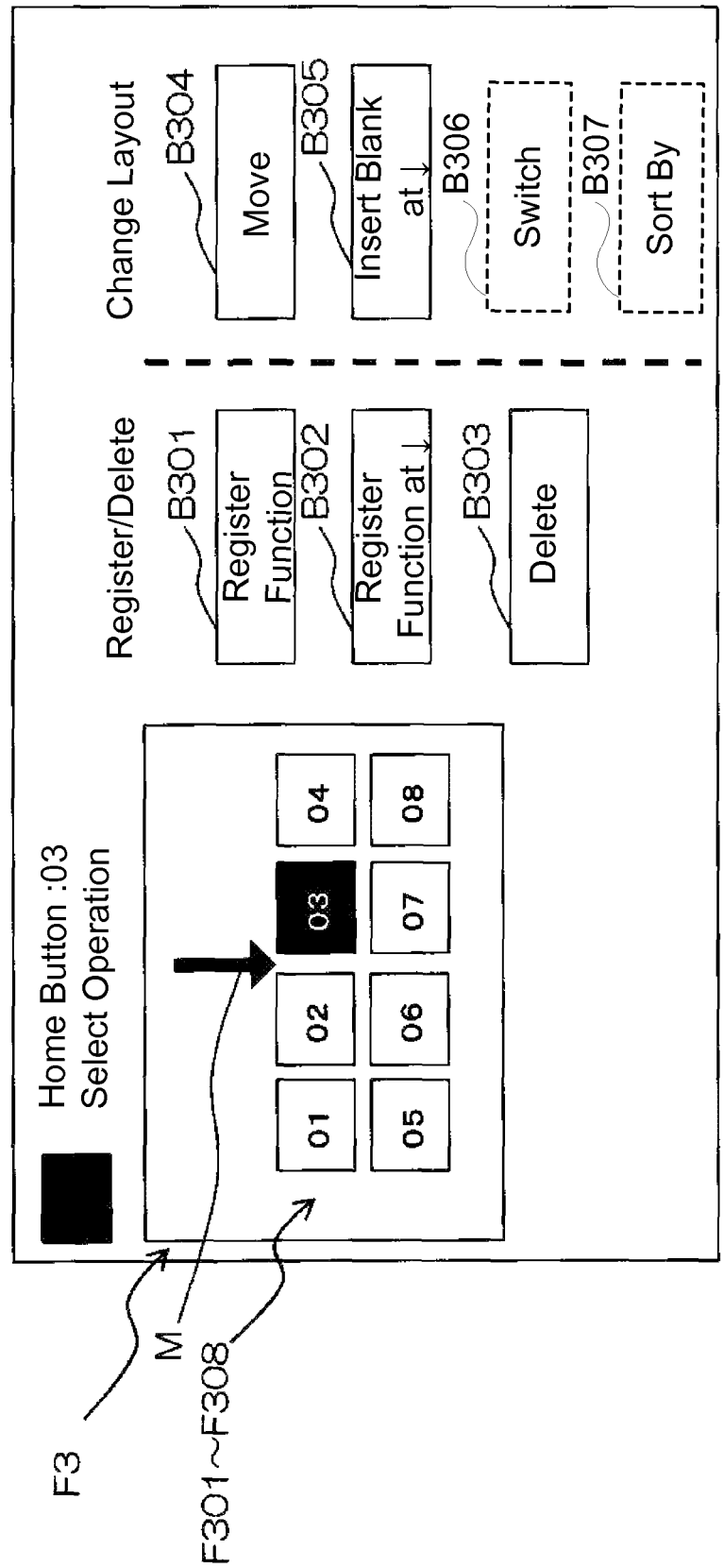
FIG. 5 is an explanatory view that shows a configuration example of an operation selection screen displayed on the image forming apparatus according to the first embodiment.

FIG. 5 is an explanatory view that shows a configuration example of an operation selection screen.

In a field F3 of the operation selection screen in FIG. 5, selection position information that visually shows a position selected by a user on the home button selection screen is displayed.

In the field F3, as the selection position information, fields F301-F308 (management numbers corresponding to the fields are shown) imitating the function selection buttons are arranged in a layout similar to one of the function selection home screen. In the field F3, a field corresponding to a position selected in the home button selection screen (field F103 corresponding to the management number 03 in FIG. 5) is displayed in an emphasized manner (displayed in a highlighted manner in FIG. 5). In the field F3, a mark M is displayed. The mark M is in an arrow shape and points to a space between the field displayed in the highlighted manner (selected position) and a field corresponding to an immediately prior management number of the highlighted field (between the field F302 corresponding to the management number 02 and the field F303 displayed in the highlighted manner). Note, a position of the mark M may be a position that points to a space between the field F303 and the field F304.

Furthermore, in the operation selection screen, 5 buttons B301-B305 for selecting an operation to a selected position are arranged. Note, the operation contents that can be selected on the operation selection screen are not limited to following 5 patterns. Various number and combination of patterns are applicable. Note, the buttons B301-B303 are for performing operations of registration and deletion of the home buttons. The buttons B304 and B305 are for performing layout change of the registered home buttons.

The button B301 (button showing "Register Function") is for saving a new home button in a selected position.

The button B302 (button showing "Register Function at ↑") is for inserting a new home button at a position that is indicated to by the mark M.

The button B303 (button showing "Delete") is for deleting registration of the home button in a selected position.

The button B304 (button showing "Move") is for moving the home button in a selected position to another position (inserting in a destination).

The button B305 (button showing "Insert Blank at ↓") is for executing a process of inserting a blank (field whose function name is unregistered) at a position that is indicated by the mark M.

Hereinafter, respective performances after that the button B301-B305 are pressed on the operation selection screen are explained. Hereinafter, the contents of the home button registration information 33 immediately before that the buttons B301-B305 are pressed on the operation selection screen is the contents in FIG. 3, and a situation after the button B203 corresponding to the management number 03 has been pressed on the home button selection screen is explained.

First, an example of a case that the button B302 for instructing insertion of a new home button (button showing "Register Function in ↓") is pressed is explained.

In this case, the menu process program 32 displays a screen for selecting a function name of a home button to be inserted to a position pointed to by the mark M.

Figure 6:
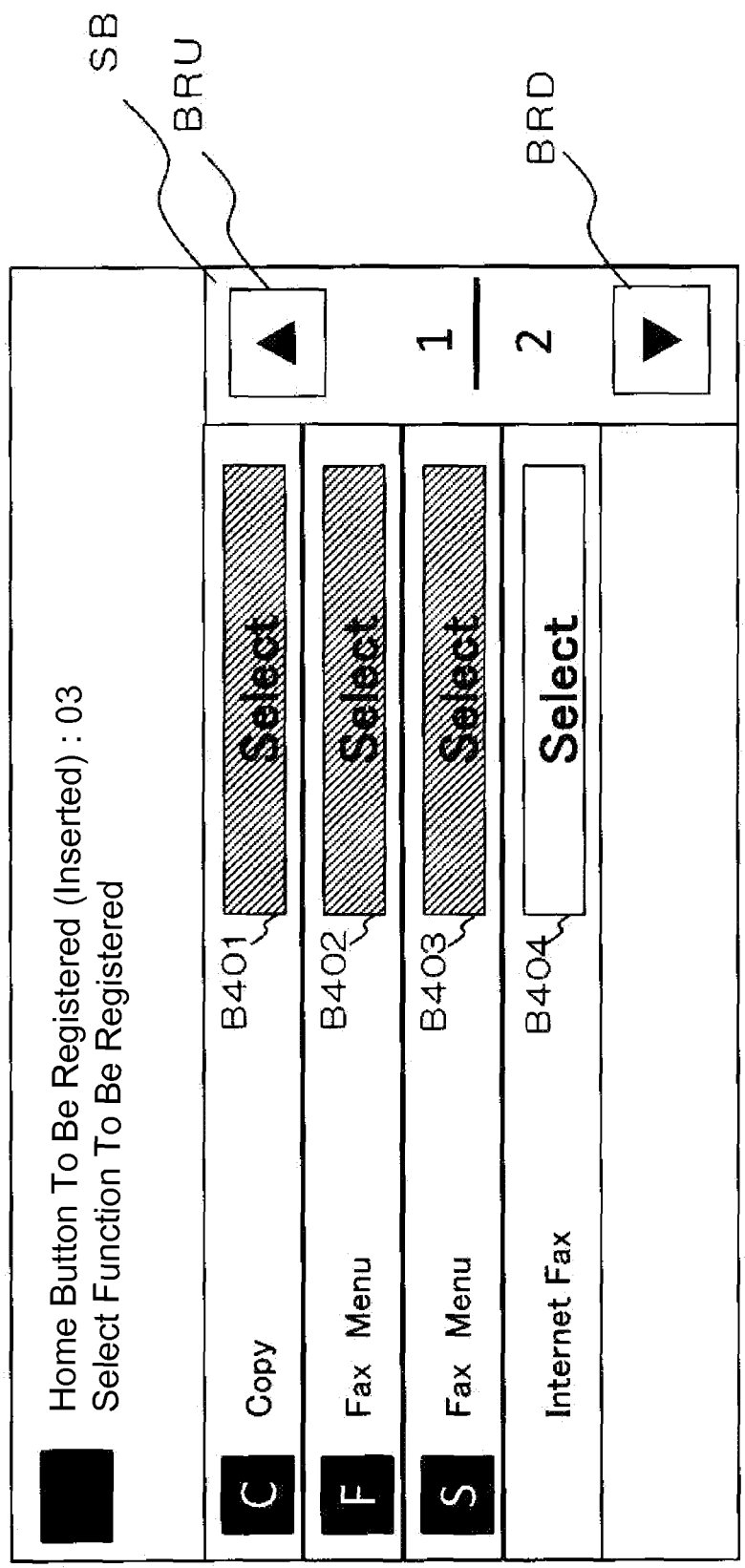
FIG. 6 is an explanatory view that shows a configuration example of a function selection screen displayed on the image forming apparatus according to the first embodiment.

FIG. 6 is an explanatory view that shows a configuration example of a function selection screen.

As illustrated in FIG. 6, on the function selection screen, various selection buttons (buttons showing "Select" along with function names) for selecting function names of the home buttons to be inserted are arranged. Also, as illustrated in FIG. 6, on the function selection screen, a scroll bar SB is arranged, and this allows a displayed screen (page) to be scrolled (switched).

Also, on the function selection screen in FIG. 6, it is impossible to select (impossible to press) selection buttons corresponding to the function names that has been already registered as the home buttons (unselectable selection buttons are shown in a hatched manner in FIG. 6). In FIG. 6, selection buttons B401-B404 respectively corresponding to function names Copy, Fax Menu, Fax Menu, and Internet Fax are arranged.

Hereinafter, as an example, performance of a case that the button B404 corresponding to the function name Internet Fax is pressed on the function selection screen in FIG. 6.

In this case, the menu process program 32 executes a process of inserting a home button whose function name is Internet Fax in a position pointed to by the mark M (between the management number 2 and the management number 3). In this case, the menu process program 32 executes a process of moving back the management numbers of the home buttons after the position pointed to by the mark M (management number 3) (except for blank (unregistered) ones) by one and newly adding the function name Internet Fax to the management number 3. FIG. 7 shows the home button registration information 33 after execution of the above-described process (insertion process of the home button) of updating the home button registration information 33 in FIG. 3 by the menu process program 32. After the update of the home button registration information 33 is executed, the menu process program 32 displays the home button selection screen based on the updated home button registration information 33.

Figure 8A:
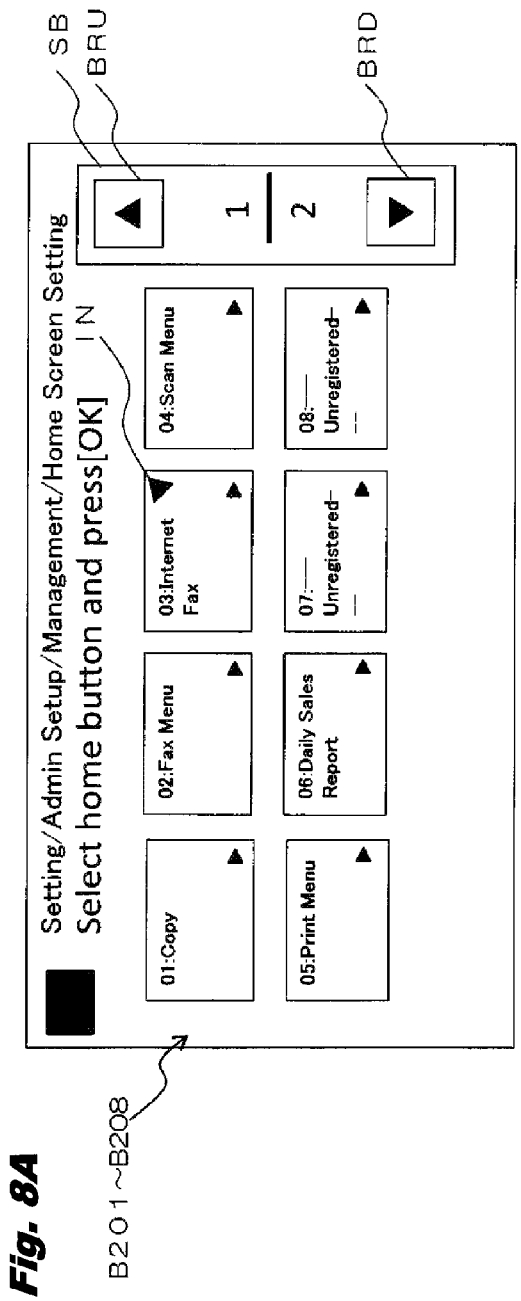
FIGS. 8A and 8B are explanatory views that show an example (No. 1) of change of the home button selection screen displayed on the image forming apparatus according to the first embodiment.
Figure 8B:
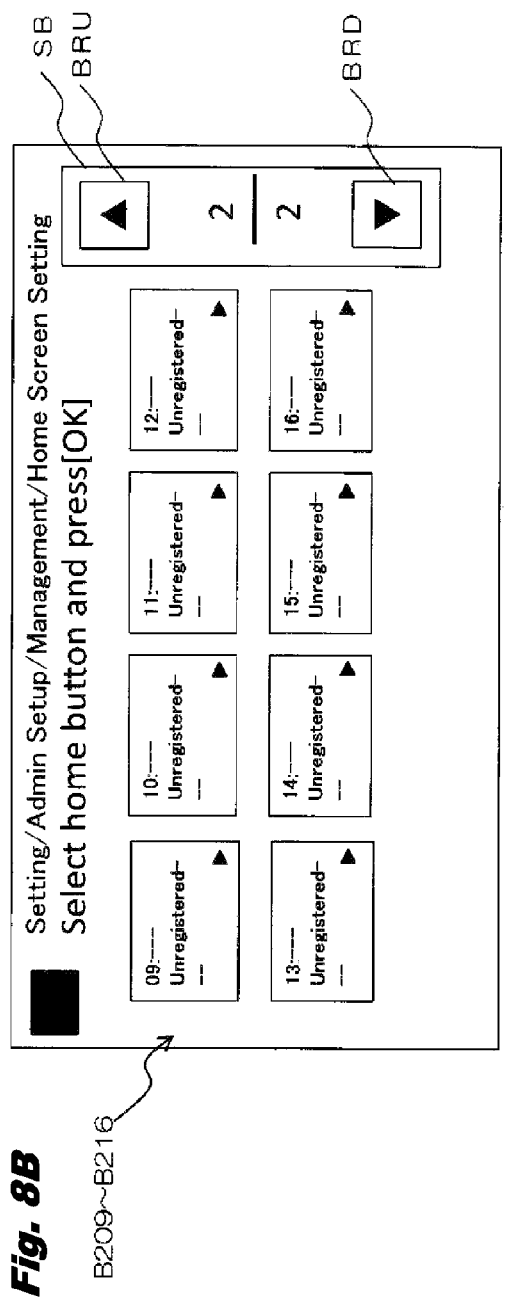

FIGS. 8A and 8B show an example of the home button selection screen displayed after the execution of the above-described update by the menu process program 32.

As illustrated in FIG. 8A, on the updated home button selection screen, the button B203 corresponding to the management number 03 shows the function name Internet Fax, which has been newly added based on the above-described home button registration information 33 in FIG. 7. Then, in FIG. 8A, in the right upper position of the inserted function selection button B203 whose function name is Internet Fax, an indicator IN (triangular image) that is a symbol of a newly inserted function selection button (home button targeted for editing) is added. The addition of the indicator IN on the home button selection screen allows a user to visually easily recognize the newly inserted function selection button. Note, when the user operates the image forming apparatus 1 to display the function selection home screen after the above-described update process, the function selection home screen shows the contents based on the updated home button registration information 33.

Next, an example of a case that the button B304 (button showing "Move") for instructing movement of the home button displayed in the highlighted manner is pressed is explained.

In this case, the menu process program 32 displays a screen (hereinafter, to be referred to as "destination selection screen") for selecting a destination (insertion destination) of the home button displayed in the highlighted manner.

FIGS. 9A and 9B are explanatory views of a configuration example of the destination selection screen.

On the destination selection screen in FIGS. 9A and 9B, fields F401-416 (showing management numbers corresponding to the fields) imitating the function selection button are arranged over two pages (two screens) in a layout the same as the one of the function selection home screen. Then, on the destination selection screen, a field (field F403 corresponding to the management number 03 in FIG. 9A) corresponding to the position selected on the home button selection screen is displayed in an emphasized manner (displayed in the highlighted manner in FIG. 9A). Also, on the destination selection screen, buttons (hereinafter, to be referred to as "destination instruction button) B401-B416 are arranged, each of the buttons showing an arrow pointing to a space between the corresponding field and a field (field corresponding to an immediately prior management number of the corresponding field) immediately prior to the corresponding field. Note, there is no immediately prior management number of the field F401 corresponding to the top management number 01, on the left upper of the field 401, the button B401 that indicates a prior position of the field F401 is arranged.

Then, when one of the destination instruction buttons is pressed on the destination selection screen, the menu process program 32 executes a process of moving and inserting the home button (displayed in the highlighted manner) selected on the home button selection screen to a position pointed to by the pressed destination instruction button.

For example, when the destination instruction button B401 (top position) is pressed on the destination instruction button in FIG. 9A, the menu process program 32 moves back the home buttons from the position pointed to by the destination instruction button B401 to the home button corresponding to a management number immediately prior to the field F403 displayed in the highlighted manner (in other words, the home buttons having the management numbers 01 and 02) by one. Then, the menu process program 32 executes a process of registering the function name (Scan Menu) corresponding to the management number displayed in the highlighted manner before the update as the function name of the management number 1. FIG. 10 shows home button registration information 33 after the execution of the above-described process (insertion process of the home button) of updating the home button registration information 33 in FIG. 3 by the menu process program 32. After the update of the home button registration information 33 is executed, the menu process program 32 displays the home button selection screen based on the updated home button registration information 33.

Figure 11:
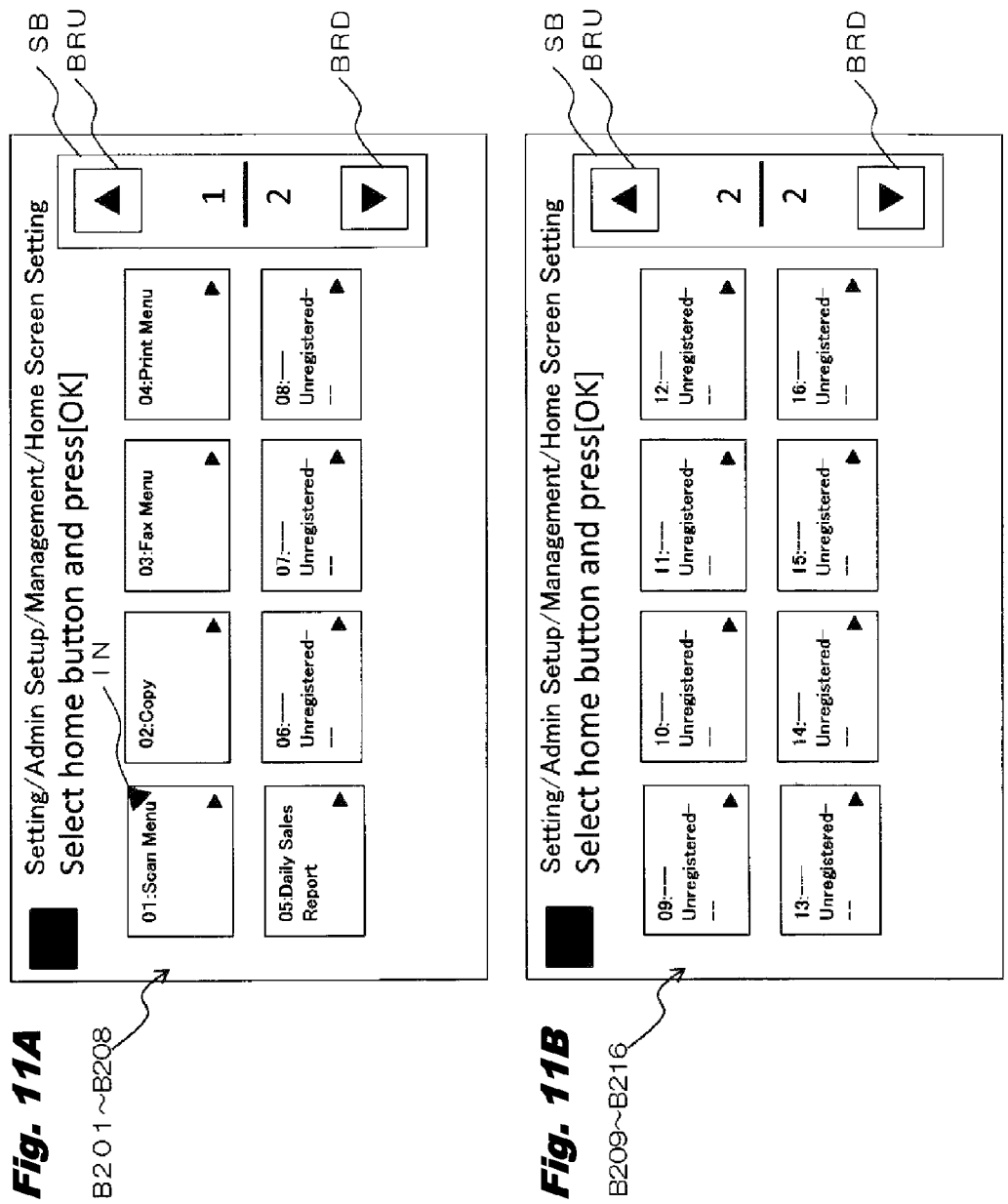
FIGS. 11A and 11B are explanatory views that show an example (No. 2) of change of the home button selection screen displayed on the image forming apparatus according to the first embodiment.

FIGS. 11A and 11B are an example of the home button selection screen displayed after the above-described update (after the process of moving the home button) by the menu process program 32.

As illustrated in FIG. 11A, it is shown that on the updated home button selection screen the home button whose function name is Scan Menu is move and inserted to the position of the position selection button B201 based on the above-described home button registration information 33 in FIG. 10. In FIG. 11A, in the right upper position of the moved and inserted function selection button B201 whose function name is Scan Menu, an indicator IN (triangular image) that is a symbol of a moved function selection button (home button targeted for editing) is added. The addition of the indicator IN on the home button selection screen allows a user to visually easily recognize the moved function selection button. Note, when the user operates the image forming apparatus 1 to display the function selection home screen after the above-described update process, the function selection home screen shows the contents based on the updated home button registration information 33.

Next, an example of a case that the button B305 (button showing "Insert Blank in ↓") for instructing insertion of a blank home button (field whose function name is unregistered) to the position pointed to by the mark M is pressed on the operation selection screen is explained.

In this case, the menu process program 32 executes a process of inserting a blank home button (field whose function name is unregistered) to the position pointed to by the mark M.

In this case, regarding the home button registration information 33, the menu process program 32 executes a process of moving the management numbers of the home buttons located after the position pointed to by the mark M (management number 3), and a process of changing the function name of the management number 3 to unregistered (process of changing the management number 3 to a blank home button). Note, in this case, the menu process program 32 may execute a process of moving back the management numbers including blank home buttons (whose function name is unregistered), or may execute a process of moving back the management numbers excluding the blank home buttons. FIG. 12 shows home button registration information 33 after the execution of the above-described update process (insertion process of the blank home button) on the home button registration information 33 in FIG. 3 by the menu process program 32. Then, the menu process program 32 displays the home button selection screen based on the updated home button registration information 33 after the execution of the above-described update process (insertion process of the blank home button).

Figure 13:
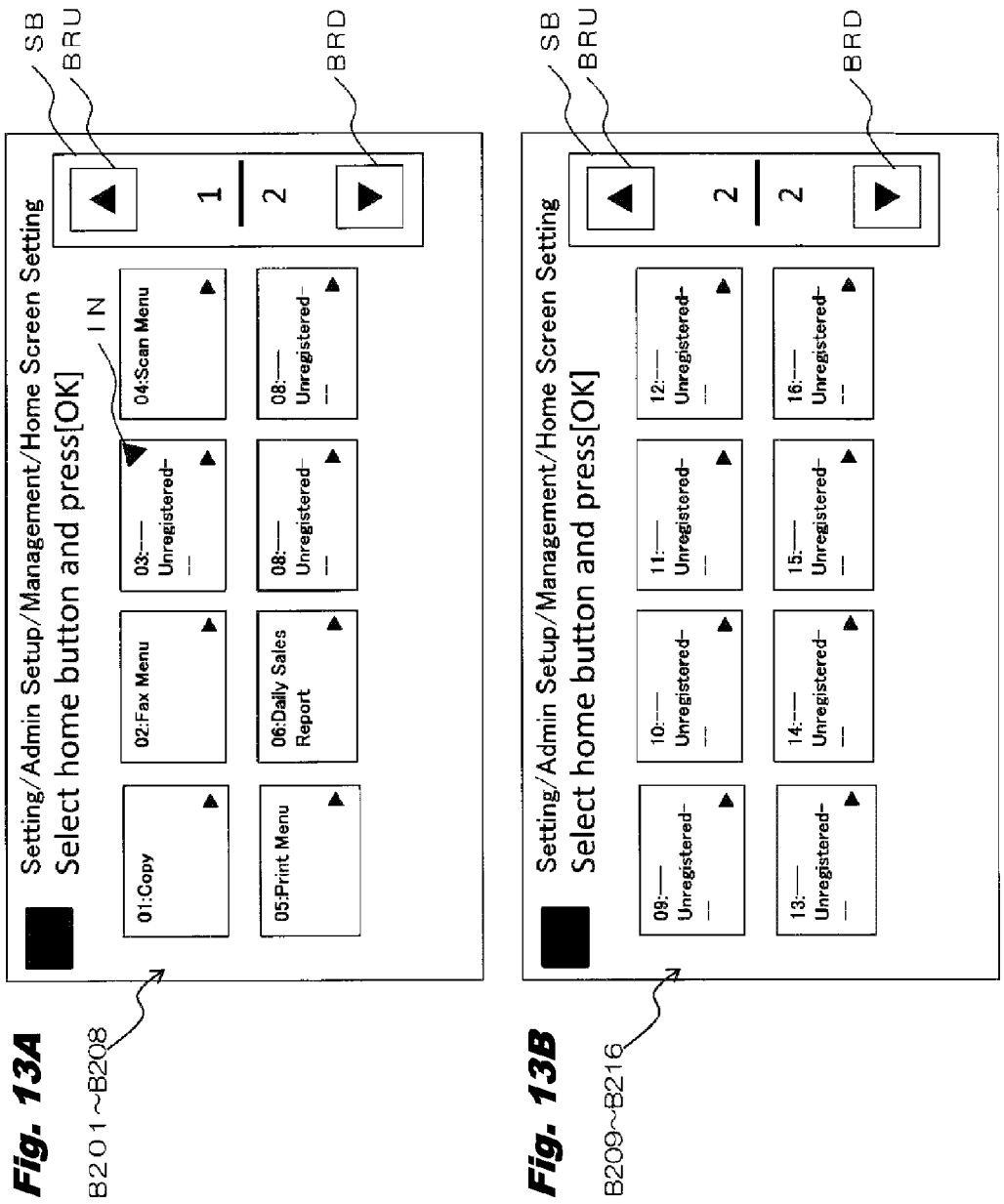
FIGS. 13A and 13B are explanatory views that show an example (No. 3) of change of the home button selection screen displayed on the image forming apparatus according to the first embodiment.

FIGS. 13A and 13B show an example of the home button selection screen displayed after the above-described update (insertion process of the blank home button) by the menu process program 32.

As illustrated in FIG. 13A, it is shown that on the updated home button selection screen the position selection button whose function name is Unregistered (position selection button showing blank) is inserted to the position of the position selection button B203 based on the above-described home button registration information 33 in FIG. 12. In FIG. 13A, in the right upper position of the moved and inserted function selection button B203 whose function name is unregistered (blank), an indicator IN (triangular image) that is a symbol of an inserted function selection button (home button targeted for editing) is added. The addition of the indicator IN on the home button selection screen allows a user to visually easily recognize the inserted position selection button. Note, when the user operates the image forming apparatus 1 to display the function selection home screen after the above-described update process, the function selection home screen shows the contents based on the updated home button registration information 33.

Next, an example of a case that the button B301 (button showing "Register Function") for saving a new home button in a position displayed in the highlighted manner is pressed is explained.

Here, it is possible to use an operation screen similar to the above-described function selection screen in FIG. 6 as an operation screen for receiving an instruction to designate a function name to be saved from a user, so a detail description is omitted. Hereinafter, a case that the function name "Internet Fax" is selected by a user as the same as the above-described example in FIG. 6 is explained.

In this case, regarding the home button registration information 33, the menu process program 32 executes a process of changing the function name corresponding to the home button displayed in the highlighted manner (home button of the management number 3) to the function name "Internet Fax" designated by a user.

FIG. 14 shows home button registration information 33 after the execution of the above-described update process (saving process of the home button) on the home button registration information 33 in FIG. 3 by the menu process program 32. Then, the menu process program 32 displays the home button selection screen based on the updated home button registration information 33 after the execution of the above-described update process (saving process of the home button) of the home button registration information 33.

FIGS. 15A and 15B show an example of the home button selection screen displayed after the execution of the above-described update (after the saving process of the home button) by the menu process program 32.

As illustrated in FIG. 15A, it is shown that on the updated home button selection screen the function name of the position selection button B203 corresponding to the management number 03 is saved as Internet Fax based on the above-described home button registration information 33 in FIG. 14. Then, in FIG. 15A, in the right upper position of the saved position selection button B203, an indicator IN (triangular image) that is a symbol of a saved position selection button (home button targeted for editing) is added. The addition of the indicator IN on the home button selection screen allows a user to visually easily recognize the saved position selection button. Note, when the user operates the image forming apparatus 1 to display the function selection home screen after the above-described update process, the function selection home screen shows the contents based on the updated home button registration information 33.

Next, an example of a case that the button B303 (button showing "Delete") for instructing registration and deletion of a home button in a selected position (deletion from the home button registration information 33) is pressed is explained.

Herein, a case that the button 303 (button showing "Delete") is pressed on the operation selection screen in FIG. 5 is given. In this case, the menu process program 32 executes a process of deleting a home button in a position displayed in the highlighted manner.

In this case, the menu process program 32 moves up the management numbers of the home buttons after the highlighted home button (home button corresponding to the management number 3) by one, and executes a process of deleting the pre-updated home button whose management number is 3 (function name: Scan Menu). Note, in this case, the menu process program 32 may execute a process of moving up the management numbers including blank home buttons (whose function name is unregistered), or may execute a process of moving up the management numbers excluding the blank home buttons. FIG. 16 shows home button registration information 33 after the execution of the above-described update process (deletion process of the home button) on the home button registration information 33 in FIG. 3 by the menu process program 32. Then, the menu process program 32 displays the home button selection screen based on the update home button registration information 33 after the execution of the above-described update process (deletion process of the home button).

FIGS. 17A and 17B show an example of the home button selection screen displayed after the execution of the above-described update (after the deletion process of the home button) by the menu process program 32.

As illustrated in FIGS. 17A and 17B, it is shown that, on the updated home button selection screen (after the deletion process of the home button), the home button displaying Scan Menu corresponding to the management number 03 before the update is deleted based on the above-described home button registration information 33 in FIG. 16. Note, when the user operates the image forming apparatus 1 to display the function selection home screen after the above-described update process, the function selection home screen shows the contents based on the updated home button registration information 33.

Figure 18:
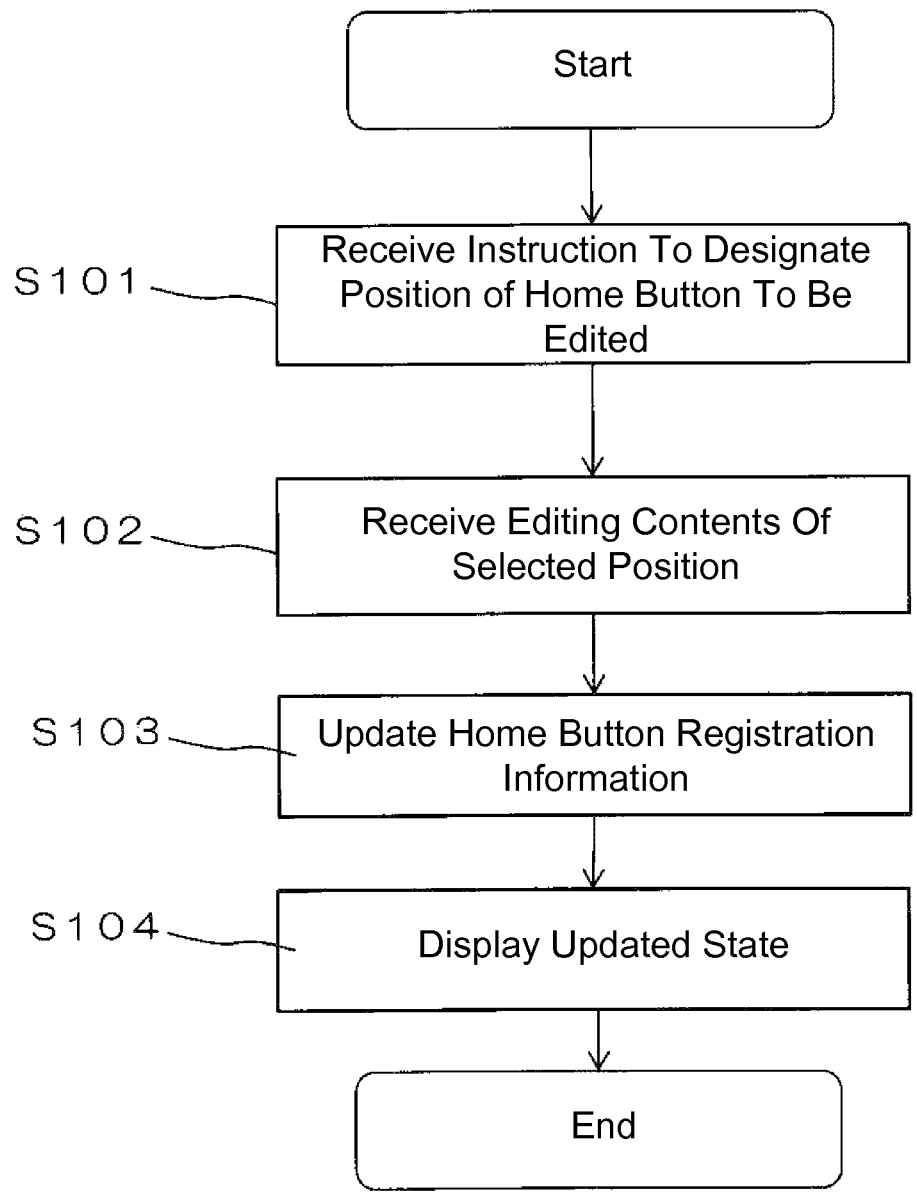
FIG. 18 is a flow diagram that shows a operation of the image forming apparatus according to the first embodiment.

As a generalized flow of the above-described process of receiving information about editing (customizing) of the function selection home screen from a use and updating by the menu process program 32, a flow diagram in FIG. 18 is illustrated.

When the home button selection screen is shown in response to a user operation, the menu operation program 32 receives an instruction to designate the position of a home button to be edited from a user using the home button selection screen (S101).

Next, the menu process program 32 executes a process of receiving editing contents of the home button in the selected position from a user using the operation selection screen, etc. (S102).

Next, the menu process program 32 updates the contents of the home button registration information 33 based on the received editing contents (S103), and displays an updated state (layout) (displays using the home button selection screen) (S104).

At this moment, the menu process program 32 emphasizes the position selection button (position selection button corresponding to the home button that is a target of addition, insertion, moving, and saving, etc.) in the position selected at the above-described S101 in this update using the symbol (indicator IN) (see FIGS. 8A, 11A, 13A, and 15A described above).

As described above, in the image forming apparatus 1, the CPU 2 (menu process program 32) functions as a function selection receipt screen display unit and an editing receipt unit. Also, in the image forming apparatus 1, the CPU 2 (menu process program 32) and the home button registration information 33 function as a function selection object management unit.

Further, as additional function, other buttons below can be added. See FIG. 5.

(1) B306: Switch

A switch button functions to exchange locations of home buttons on the screen. For example, the user selects two fields of the home buttons, next presses the switch button. The management numbers corresponding to the selected fields are exchanged, causing the location of the home buttons to switch. The switch functions can be applied to three or more buttons selected.

(2) B307: Sort By

A sort button functions to reorder (arrange) locations of home buttons on the screen. For the function, it is not necessary to select any field of the home button. For example, when the user presses the sort button, the management numbers of all the home buttons are to be reordered by a certain rules. The rules may be an order of registered dates of the home buttons, or an alphabetic order of the function names. Further, when user names who registered the home buttons are stored, the management numbers can be grouped according to the user's names, the grouped home buttons can be sorted by the user's names. A group that includes functions most may be topped or be put at the bottom.

(A-3) Effects of First Embodiment

According to the first embodiment, following effects can be obtained.

In the image forming apparatus 1, the menu process program 32 receives a selection of a position that is a target of editing on the home button selection screen from a user, and receives contents of an editing instruction of the selected position using the operation selection screen, etc. This enables a user-preferred home button to be easily arranged in a user-preferred position.

For example, the registration and deletion of the home button (editing instruction received by the buttons B301-B303) on the operation selection screen (see FIG. 5 above) enables the home button of a user-preferred function to be easily arranged in a preferred position. In the image forming apparatus 1, for example, it is possible to provide a function selection home screen that satisfies user requests, which a user wants to arrange a most frequently used home button in a left upper position, for example.

(B) Second Embodiment

Hereinafter, a second embodiment of an image processing apparatus and a method for controlling the image processing device in the present invention is explained in detail as referring to the drawings. Hereinafter, an example that the image processing apparatus in the present invention is applied to an image forming apparatus performing as a multifunctional peripheral (MFP) is explained.

(B-1) Configuration of the Second Embodiment

Figure 19:
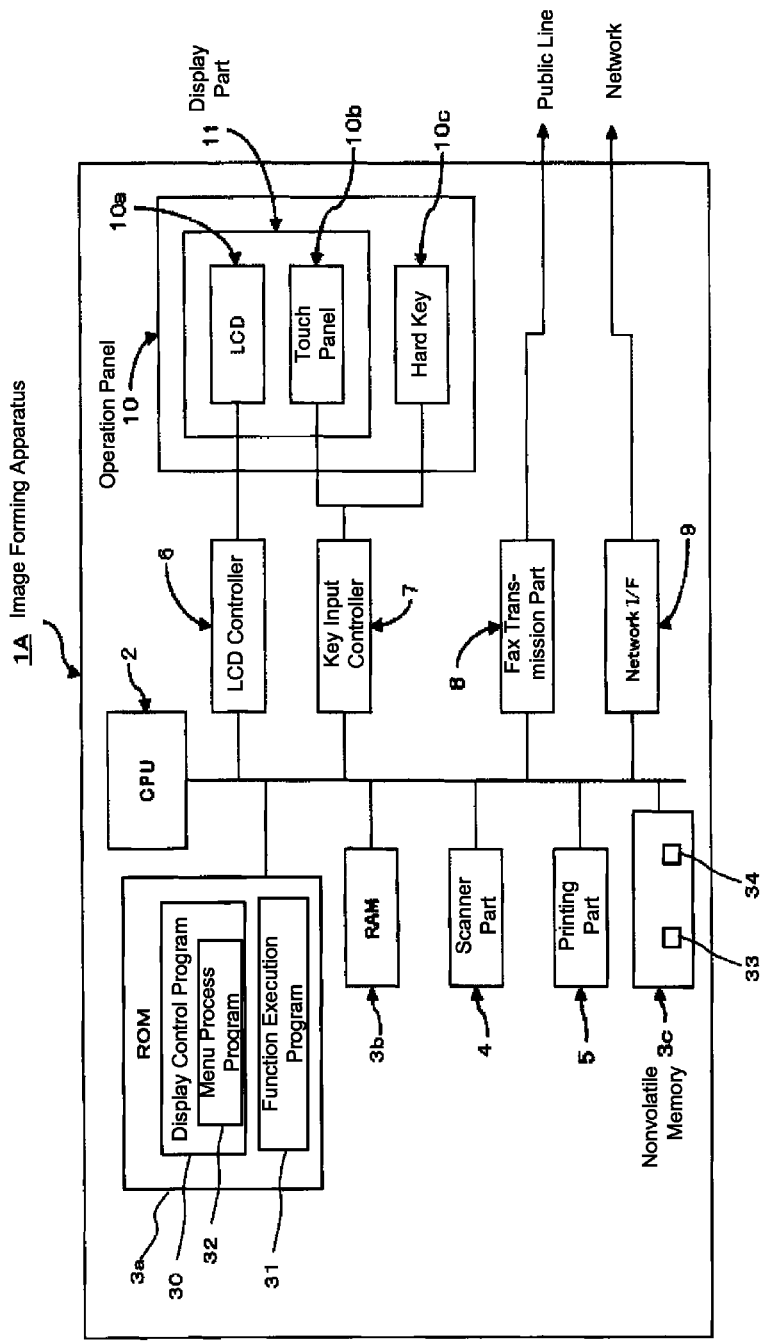
FIG. 19 a block diagram that shows a functional configuration of an image forming apparatus according to a second embodiment.

FIG. 19 is a block diagram that shows a functional configuration of an image forming apparatus 1A of the second embodiment. The same or corresponding reference numbers are given to elements that are the same as or correspond to the ones in FIG. 1. Hereinafter, difference between the second embodiment and the first embodiment is explained.

In the image forming apparatus 1A in the second embodiment, function execution counting information 34 for counting the number of usage times (the number of execution times) of each function is provided in the nonvolatile memory 3c. Then, when a function is executed not via the function selection home screen, the menu process program 32 executes a process of counting (incrementing) the number of usage times of the function of the function execution counting information 34.

FIG. 20 is an explanatory view that shows a configuration example of the function execution counting information 34.

As illustrated in FIG. 20, in the function execution counting information 34, a counted value of the number of usage times (the number of times of execution not via the function selection home screen) of each function name is memorized.

The menu process program 32 notifies a user of that a function already registered on the function selection home screen is executed via not the function selection home screen (that the function is arranged on the function selection home screen) based on the home button registration information 33. As a result of this, in the image forming apparatus 1, it is possible to prompt a user to execute the function in an easier way next time (execute from the function selection home screen).

Note, when the number of usage times of a function reaches a threshold N in the function execution counting information 34, the menu process program 32 executes a process of adding and registering a home button of the function to the function selection home screen (registering to the home button registration information 33). In this case, a position (management number) of the home button added and registered by the menu process program 32 is not limited. For example, it is possible to save in a blank home button (unregistered field) with the smallest management number. Also, when the process of adding a home button is executed on a function whose number of usage times has already reached the threshold N, the menu process program 32 notifies a user of that the function selection home screen has been automatically updated (displays the message on the operation screen of the LCD 10a). Therefore, in the image forming apparatus 1, it is possible to prompt a user to execute the function in an easier way next time (execute from the function selection home screen).

(B-2) Performance of Second Embodiment

Next, a performance of the image forming apparatus 1A of the second embodiment having the above-described configuration is explained. Hereinafter, only different portions of the image forming apparatus 1A of the second embodiment from the one of the first embodiment are explained.

Figure 21:
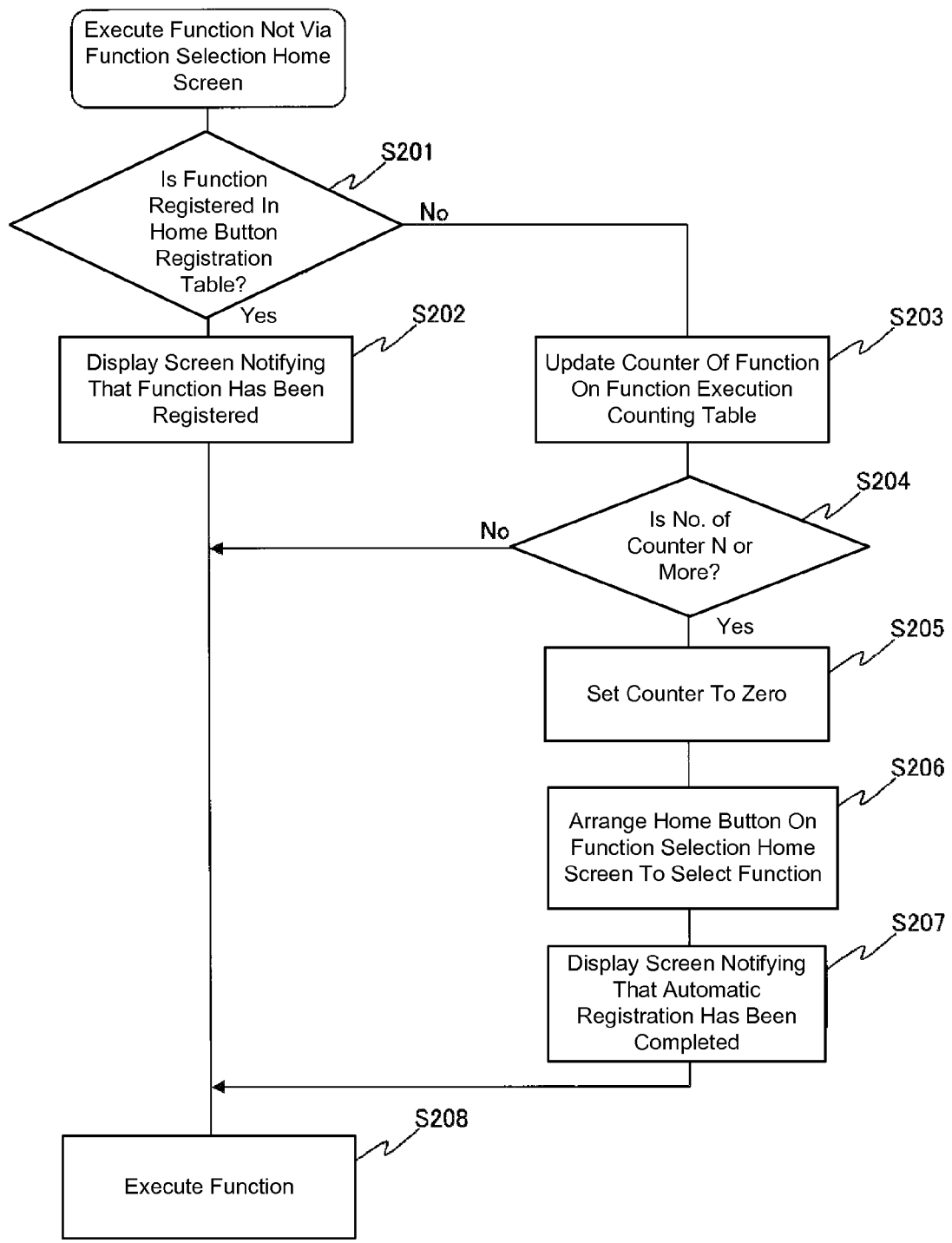
FIG. 21 is a flow diagram that shows a operation of the image forming apparatus according to the second embodiment.

FIG. 21 shows a flow diagram of a performance of the image forming apparatus 1A (menu process program 32) when the image forming apparatus 1A receives an instruction to execute a function by a user operation not via the function selection home screen.

When a process of a function is executed not via the function selection home screen in the image forming apparatus 1A, first, the menu process program 32 confirms if the function to be executed this time is registered in the home button registration information 33 (S201).

When the menu process program 32 confirms that a home button of the function is registered, the process goes to S202 that is described below. When the function is not registered, the process goes to S203 that is described below.

Figure 22:
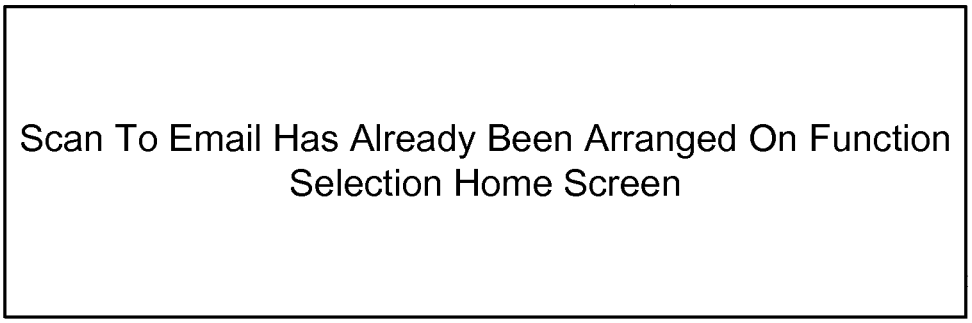
FIG. 22 is an explanatory view (No. 1) that shows an example of a message displayed on the image forming apparatus according to the second embodiment.

When it is confirmed in S201 that a home button of the function has been already registered, a message for notifying a user of the confirmation (the function has been already arranged on the function selection home screen) is popped up on the screen of the LCD 10a (S202). In this case, the menu process 32 shows a pop-up message "Scan to Email has been already arranged on the function selection home screen" as illustrated in FIG. 22.

Next, the menu process program 32 instructs the function execution program 31 to execute the function (S208)

When it is confirmed in S201 that a home button of the function has not been registered, the menu process program 32 updates the function execution counting information 34 (increments the counter of the number of usage times corresponding to the function) (S203), and confirms if the number of usage times of the function exceeds the threshold N (S204).

When the number of usage times of the function doesn't exceed the threshold N, the menu process program 32 goes to S208 and instructs the function execution program 31 to execute the function.

On the other hand, when the number of usage times of the function exceeds the threshold N, the menu process program 32 sets the number of usage times of the function (counter) to zero (S205), and executes an arrangement of a home button of the function on the function selection home screen (in the home button registration information 33) (S206).

Figure 23:
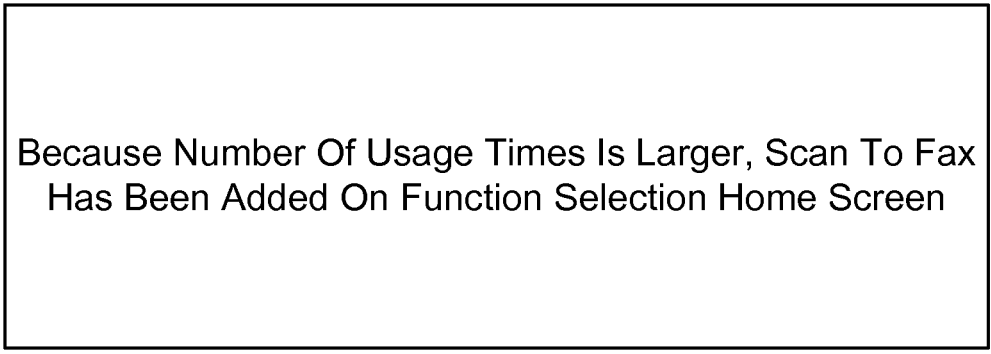
FIG. 23 is an explanatory view (No. 2) that shows an example of a message displayed on the image forming apparatus according to the second embodiment.

When the menu process program 32 completes the execution of a process of arranging a home button of the function on the function selection home screen (in the home button registration information 33), a message for notifying a user of the confirmation (the function has been already arranged on the function selection home screen) is popped up on the screen of the LCD 10a (S207). In this case, for example, the menu process program 32 shows a pop-up message "Because the number of usage times of ScanToFax is large, ScanToFax is added on the function selection home screen" as illustrated in FIG. 23.

Next, the menu process program 32 goes to S207, and instructs the function execution program 31 to execute the received function.

As described above, in the image forming apparatus 1A, the CPU 2 (menu process program 32) and the function execution counting information 34 function as a function selection number counting unit. Also in the image forming apparatus 1A, the CPU 2 functions as an information output unit.

(B-3) Effects of Second Embodiment

According to the second embodiment, following effects are obtained in addition to the effects of the first embodiment.

In the image forming apparatus 1A, based on the number of execution times (selection times) of each function by user, the function selection home screen is automatically updated (home button is added), and a user is notified of this. Therefore, in the second embodiment, even to a user who doesn't know a method of customizing the function selection home screen (method of editing), further simplified operation circumstance using the function selection home screen can be provided.

Also in the image forming apparatus 1A, when a function whose home button has already been registered on the function selection home screen is selected not via the function selection home screen, a notification that the function is selectable on the function selection home screen is given. Therefore, even to a user who doesn't know an existence of the function selection home screen, further simplified operation circumstance using the function selection home screen can be provided.

(C) Other Embodiments

The present invention is not limited to the above-described embodiments. Other modified embodiments shown below as examples are also given.

(C-1) In the above-described embodiments, an example that a MFP is applied to the image processing apparatus and the method of controlling the image processing apparatus of the present invention is given. However, it is also possible to apply the present invention to other image processing apparatus that performs the same and similar display control such as a scanner for scanning manuscripts, a fax server for performing only data transmission of facsimile, and the like.

(C-2) In the above-described embodiments, when an insertion process of a home button is executed and a process of inserting a blank home button is inserted, the menu process program 32 may execute a process of moving back the management numbers including blank home buttons, or may execute a process of moving back the management numbers excluding the blank home buttons. At this time, when there is no blank home button (home button whose function name is unregistered) for executing a process of moving back the existing home buttons, the menu process program 32 may set the button B302 (button showing "Register Function in ↓") for receiving the process of inserting a home button and the button B305 (button showing "Insert Blank in ↓") for receiving the process of inserting a blank home button inoperable (unpressable)

What is claimed is:

1. An image processing apparatus, comprising:
a function selection receipt screen display part that displays a function selection receipt screen that displays a plurality of function selection objects arranged thereon, the function selection objects being for selecting functions related to information processes;
a function selection object management unit that manages screen configuration information that respectively relates the plurality of function selection objects displayed on the function selection receipt screen by the function selection receipt screen display part to information of functions of the information processes corresponding to the function selection objects;
an editing receipt part that receives an editing instruction for editing the function selection receipt screen that is
for editing the functions related to the information processes corresponding to the function selection objects on the function selection receipt screen, or
for editing an arrangement position of the function selection objects on the function selection receipt screen, wherein
the function selection object management unit edits the screen configuration information based on the editing instruction received by the editing receipt part,
the function selection receipt screen display part displays the function selection receipt screen based on the screen configuration information managed by the function selection object management unit,
the editing receipt part further comprises
a position selection screen for selecting a position to be edited on the function selection receipt screen; and
an editing operation contents receipt screen for receiving editing operation contents of the position selected on the position selection screen, and
on the editing operation contents receipt screen, a blank insertion process of inserting a blank function selection object having no registered function in a position selected on the position selection screen is received as an editing operation content.

2. The image processing apparatus according to claim 1, wherein
on the editing operation contents receipt screen displayed by the editing receipt part, at least registration and deletion of the function selection object in the position selected on the position selection screen is to be received as the editing operation contents.

3. The image processing apparatus according to claim 1, wherein
on the function selection receipt screen, a certain number of the function selection objects are simultaneously displayed and an operation of scrolling a displayed position is received.

4. The image processing apparatus according to claim 1, wherein
the editing receipt part further comprises a position selection screen for selecting a position to be edited on the function selection receipt screen, and
on the position selection screen, position selection receipt objects are arranged at positions respectively corresponding to the function selection objects on the function selection receipt screen, and the position selection screen has a configuration that receives a position selection to be edited on the function selection receipt screen by receiving an operation of the position selection receipt object, and
the editing receipt part displays the position selection screen that displays a function selection object targeted by the position selection in an emphasized manner after receiving an input of either one of the editing instructions.

5. The image processing apparatus according to claim 1, wherein
when no more blank function selection object is able to be inserted according to the screen configuration information, the editing receipt part sets the blank insertion process unselectable on the editing operation contents receipt screen.

6. The image processing apparatus according to claim 1, wherein
the function selection receipt screen and the editing operation content receipt screen have the same layout.

7. The image processing apparatus according to claim 1, wherein
the editing receipt part displays an insertion indication mark on the position selection screen, and
a function selection object is inserted at a position indicated by the insertion indication mark.

8. The image processing apparatus according to claim 1, wherein
functions that have been registered as the function selection object are not selectable for insertion to the function selection receipt screen.

9. The image processing apparatus according to claim 1, wherein
when a function selection object is inserted, a position of an existing function selection object that is subsequent to the inserted function selection object is shifted.

10. The image processing apparatus according to claim 1, wherein
an inserted object indication mark is displayed on the inserted function selection object to indicate the insertion of the inserted function selection object.

11. An image processing apparatus, comprising:
a function selection receipt screen display part that displays a function selection receipt screen that displays a plurality of function selection objects arranged thereon, the function selection objects being for selecting functions related to information processes;
a function selection object management unit that manages screen configuration information that respectively relates the plurality of function selection objects displayed on the function selection receipt screen by the function selection receipt screen display part to information of functions of the information processes corresponding to the function selection objects;
an editing receipt part that receives an editing instruction for editing the function selection receipt screen that is
for editing the functions related to the information processes corresponding to the function selection objects on the function selection receipt screen, or
for editing an arrangement position of the function selection objects on the function selection receipt screen; and
a function selection number counting unit that counts the number of selection times that is the number of times of selecting a function not via the function selection receipt screen, wherein
the function selection object management unit edits the screen configuration information based on the editing instruction received by the editing receipt part,
the function selection receipt screen display part displays the function selection receipt screen based on the screen configuration information managed by the function selection object management unit, and
when a function whose number of selection times counted by the function selection number counting unit exceeds a threshold is found, the function selection object management unit executes an object addition update process that registers a function selection object of the function to the screen configuration information.

12. An image processing apparatus, comprising:
a function selection receipt screen display part that displays a function selection receipt screen that displays a plurality of function selection objects arranged thereon, the function selection objects being for selecting functions related to information processes;
a function selection object management unit that manages screen configuration information that respectively relates the plurality of function selection objects displayed on the function selection receipt screen by the function selection receipt screen display part to information of functions of the information processes corresponding to the function selection objects;
an editing receipt part that receives an editing instruction for editing the function selection receipt screen that is
for editing the functions related to the information processes corresponding to the function selection objects on the function selection receipt screen, or
for editing an arrangement position of the function selection objects on the function selection receipt screen; and
an information output unit that outputs information notifying that a function is selectable on the function selection receipt screen when the function is a registered function in the screen configuration information and the function is selected via not the function selection receipt screen, wherein
the function selection object management unit edits the screen configuration information based on the editing instruction received by the editing receipt part, and
the function selection receipt screen display part displays the function selection receipt screen based on the screen configuration information managed by the function selection object management unit.

13. The image processing apparatus according to claim 12, wherein
the function selection receipt screen and the editing operation content receipt screen have the same layout.

14. The image processing apparatus according to claim 12, wherein
the editing receipt part displays an insertion indication mark on the position selection screen, and
a function selection object is inserted at a position indicated by the insertion indication mark.

15. The image processing apparatus according to claim 12, wherein functions that have been registered as the function selection object are not selectable for insertion to the function selection receipt screen.

16. The image processing apparatus according to claim 12, wherein when a function selection object is inserted, a position of an existing function selection object that is subsequent to the inserted function selection object is shifted.

17. The image processing apparatus according to claim 12, wherein an inserted object indication mark is displayed on the inserted function selection object to indicate the insertion of the inserted function selection object.

18. A method for controlling an image processing apparatus that comprises a function selection receipt screen display unit, a function selection object management unit, and an editing receipt unit, comprising causing the function selection receipt screen display unit to display a function selection receipt screen on which a plurality of function selection objects for receiving function selection related to image processing are arranged, causing the editing receipt unit to receive an input of an editing instruction from the function selection receipt screen as using a position selection screen for selection a position of the function selection receipt screen to be edited and an editing operation contents receipt screen for receiving editing operation contents of the position selected on the position selection screen when the function selection object management unit manages screen configuration information that a function identifier related to the function selection object and an arrangement position identifier of the function selection object are corresponded for the function selection object displayed on the function selection receipt screen by the function selection receipt screen display unit, and causing the function selection object management unit to update the screen configuration information based on the editing instruction received by the editing receipt unit, wherein on the editing operation contents receipt screen, a blank insertion process of inserting a blank function selection object having no registered function in a position selected on the position selection screen is received as an editing operation content.

\* \* \* \* \*